US012791000B2

(12) United States Patent
Hattori et al.

(10) Patent No.: US 12,791,000 B2
(45) Date of Patent: Nov. 10, 2026

(54) ROLLER LIFTER

(71) Applicant: OTICS CORPORATION, Nishio (JP)

(72) Inventors: Jun Hattori, Nishio (JP); Masatoshi Sugiura, Nishio (JP); Akihiro Suzuki, Nishio (JP)

(73) Assignee: OTICS CORPORATION, Nishio (JP)

( * ) Notice: Subject to any disclaimer, the term of this patent is extended or adjusted under 35 U.S.C. 154(b) by 0 days.

(21) Appl. No.: 19/226,705

(22) Filed: Jun. 3, 2025

(65) Prior Publication Data

US 2025/0376966 A1 Dec. 11, 2025

(30) Foreign Application Priority Data

Jun. 7, 2024 (JP) ................................ 2024-092899

(51) Int. Cl.
*F02M 59/10* (2006.01)
*F01L 1/16* (2006.01)

(52) U.S. Cl.
CPC .............. *F02M 59/102* (2013.01); *F01L 1/16* (2013.01); *F02M 2200/09* (2013.01)

(58) Field of Classification Search
CPC ............. F01L 1/14; F01L 1/16; F02M 59/102
See application file for complete search history.

(56) References Cited

U.S. PATENT DOCUMENTS

| | | | | |
|---|---|---|---|---|
| 8,863,615 | B2 * | 10/2014 | Yabuuchi | F01L 1/143 74/569 |
| 9,422,834 | B2 * | 8/2016 | Fujii | F01L 1/143 |
| 10,167,833 | B2 * | 1/2019 | Oka | F02M 59/44 |
| 11,578,717 | B2 * | 2/2023 | Cornett | F04B 53/146 |
| 2017/0051637 | A1 | 2/2017 | Todo et al. | |
| 2017/0218905 | A1 | 8/2017 | Oka | |

FOREIGN PATENT DOCUMENTS

| | | |
|---|---|---|
| JP | 2017-040185 A | 2/2017 |
| JP | 2017-133423 A | 8/2017 |
| JP | 2018-044487 A | 3/2018 |

* cited by examiner

*Primary Examiner* — Thomas C Diaz
(74) *Attorney, Agent, or Firm* — Smth, Gambrell & Russell, LLP

(57) ABSTRACT

A roller lifter includes: a lifter body that is cylindrical and that reciprocates in a lifter guide in an up-down direction; a pair of facing portions that protrude downward from the lifter body and face each other in a manner spaced apart from each other in a radial direction of the lifter body; a rotation stopper that is positioned between the pair of facing portions, and has a shape protruding downward from the lifter body and bent outward in the radial direction; a shaft member that extends in the radial direction and has both ends in the radial direction respectively supported on the pair of facing portions; a roller that is rotatably provided on the shaft member and is in contact with a cam; and an inertial mass that is provided below the lifter body. A part below the rotation stopper does not have the inertial mass and is open.

6 Claims, 12 Drawing Sheets

ROLLER LIFTER

CROSS-REFERENCE TO RELATED APPLICATION

This application claims the benefit of Patent Application No. 2024-92899, filed in Japan on Jun. 7, 2024, the content of which is incorporated herein by reference.

BACKGROUND OF THE INVENTION

The present disclosure relates to a roller lifter.

The roller lifter disclosed in JP 2018-44487 A includes a cylindrical peripheral wall, a pair of left and right support walls protruding downward from the peripheral wall, and a rotation stopper having a shape protruding downward from a front part of the lower edge of the peripheral wall and bending frontward. The roller lifter further includes a shaft member extending in the left-right direction and having left and right ends respectively supported on the support walls, and a roller provided rotatably on the shaft member. The roller is in contact with a cam, and is driven to rotate by the rotation of the cam. As the roller is driven to rotate, the roller lifter reciprocates in the up-down directions inside a lifter guide. Other related art documents pertinent to a roller lifter include JP 2017-133423 A and JP 2017-40185 A.

These kinds of roller lifter have a problem in that the roller lifter tilts and makes swinging motions inside the lifter guide during reciprocating movement, colliding against the inner wall of the lifter guide and generating lifter-hitting noise (see JP 2017-133423 A). In response to this, there is a demand for a technology capable of suppressing such swinging motions of the roller lifter without significantly changing the structure of the existing roller lifter.

BRIEF SUMMARY OF THE INVENTION

An object of the present disclosure is therefore to provide a roller lifter capable of suppressing the swinging motions when the roller lifter reciprocates in the lifter guide.

A roller lifter according to the present disclosure is a roller lifter including: a lifter body that is cylindrical and that reciprocates in a lifter guide in an up-down direction; a pair of facing portions that protrude downward from the lifter body and face each other in a manner spaced apart from each other in a radial direction of the lifter body; a rotation stopper that is positioned between the pair of facing portions and has a shape protruding downward from the lifter body and bent outward in the radial direction; a shaft member that extends in the radial direction and has both ends in the radial direction respectively supported on the pair of facing portions; a roller that is rotatably provided on the shaft member and is in contact with a cam; and an inertial mass that is provided below the lifter body. A part below the rotation stopper does not have the inertial mass and is open.

According to the present disclosure, it is possible to provide a roller lifter capable of suppressing the swinging motions when the roller lifter reciprocates in the lifter guide.

BRIEF DESCRIPTION OF THE SEVERAL VIEWS OF THE DRAWINGS

Embodiments of the present invention will be described below with reference to drawings.

DETAILED DESCRIPTION

Specific examples of the present disclosure will now be described below with reference to the drawings. These exemplary embodiments are not intended to limit the present invention in any way, and the present invention is intended to include any and all modifications falling within the scope defined by the claims or within the scope equivalent to the claims.

First Embodiment

Figure 1:
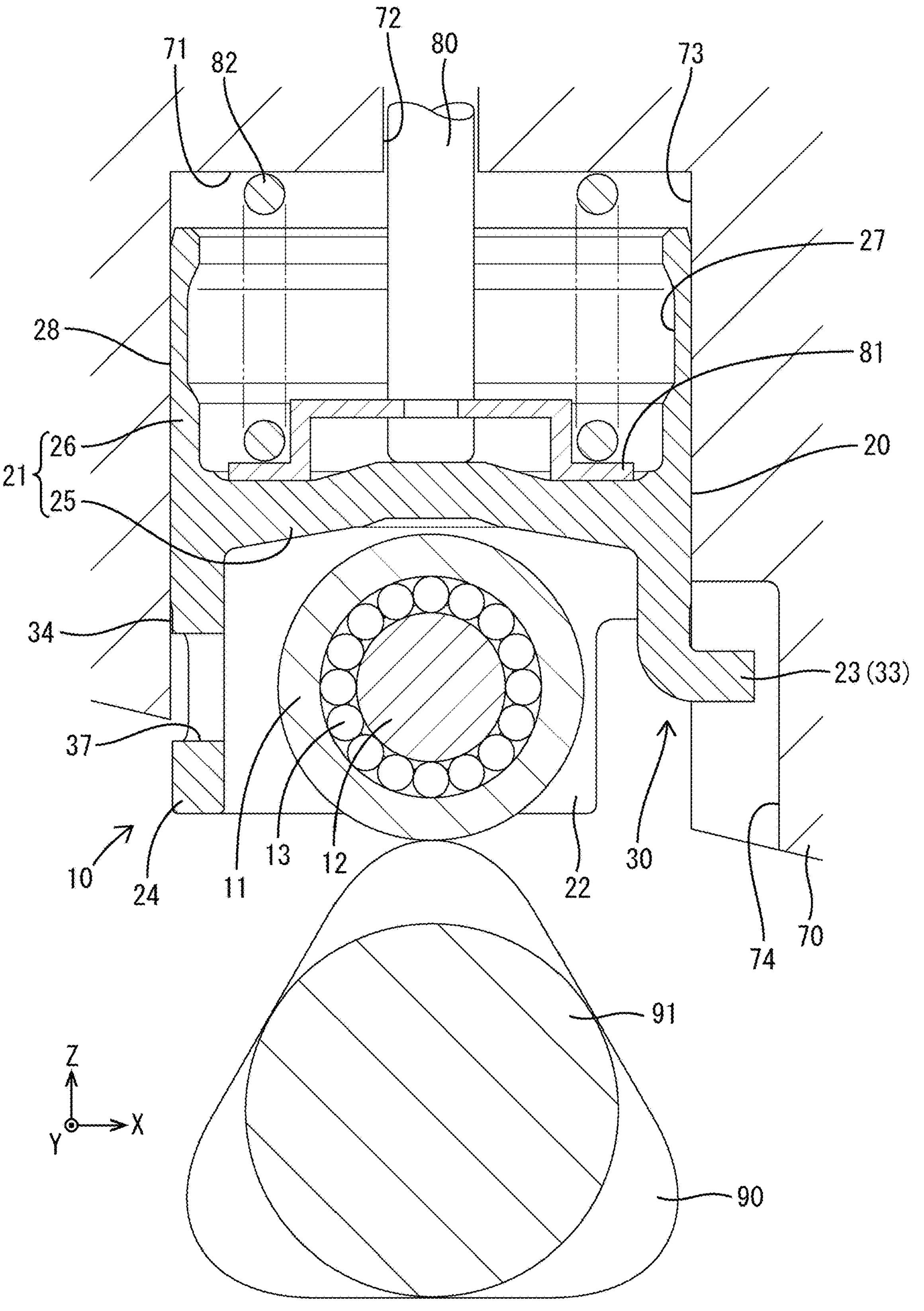
FIG. 1 is a cross-sectional view of a fuel feeding apparatus including a roller lifter according to a first embodiment.

As illustrated in FIG. 1, a first embodiment of the present disclosure illustrates an example of a roller lifter 10 used for a fuel feeding apparatus (fuel feeder pump) included in an internal combustion engine, such as an engine of an automobile. The roller lifter 10 includes a roller 11 and a lifter 20. The fuel feeding apparatus includes a plunger 80 and a cam 90, in addition to the roller lifter 10. The roller lifter 10 and the plunger 80 reciprocate in a lifter guide 70, by being driven by the cam 90. In the following description, the direction in which the roller lifter 10 and the plunger 80 reciprocate will be referred to as an up-down direction. A radial direction is a direction orthogonal to the up-down direction, and corresponds to the radial direction of the lifter 20 having a cylindrical shape. The radial direction includes both of a left-right direction and a front-back direction. For the sake of convenience, the direction in which a pair of facing portions 22, to be described later, face each other will be referred to a left-right direction, and the side on which a rotation stopper 23, to be described later, is positioned with respect to a lifter body 21 will be referred to as a front side. In FIG. 1, reference signs X, Y, and Z represent the front side, the left side, and the upper side, respectively.

Roller Lifter 10 and Nearby Structures

The lifter 20 is a cylindrical body made of metal, and integrally includes a lifter body 21, a pair of facing portions 22, a rotation stopper 23, and an inertial mass 24. The lifter body 21 has a cylindrical shape, and includes a base wall 25 having a horizontal plate-like shape with a circular outer periphery, and a peripheral wall 26 rising upright from the outer periphery of the base wall 25.

Figure 2:
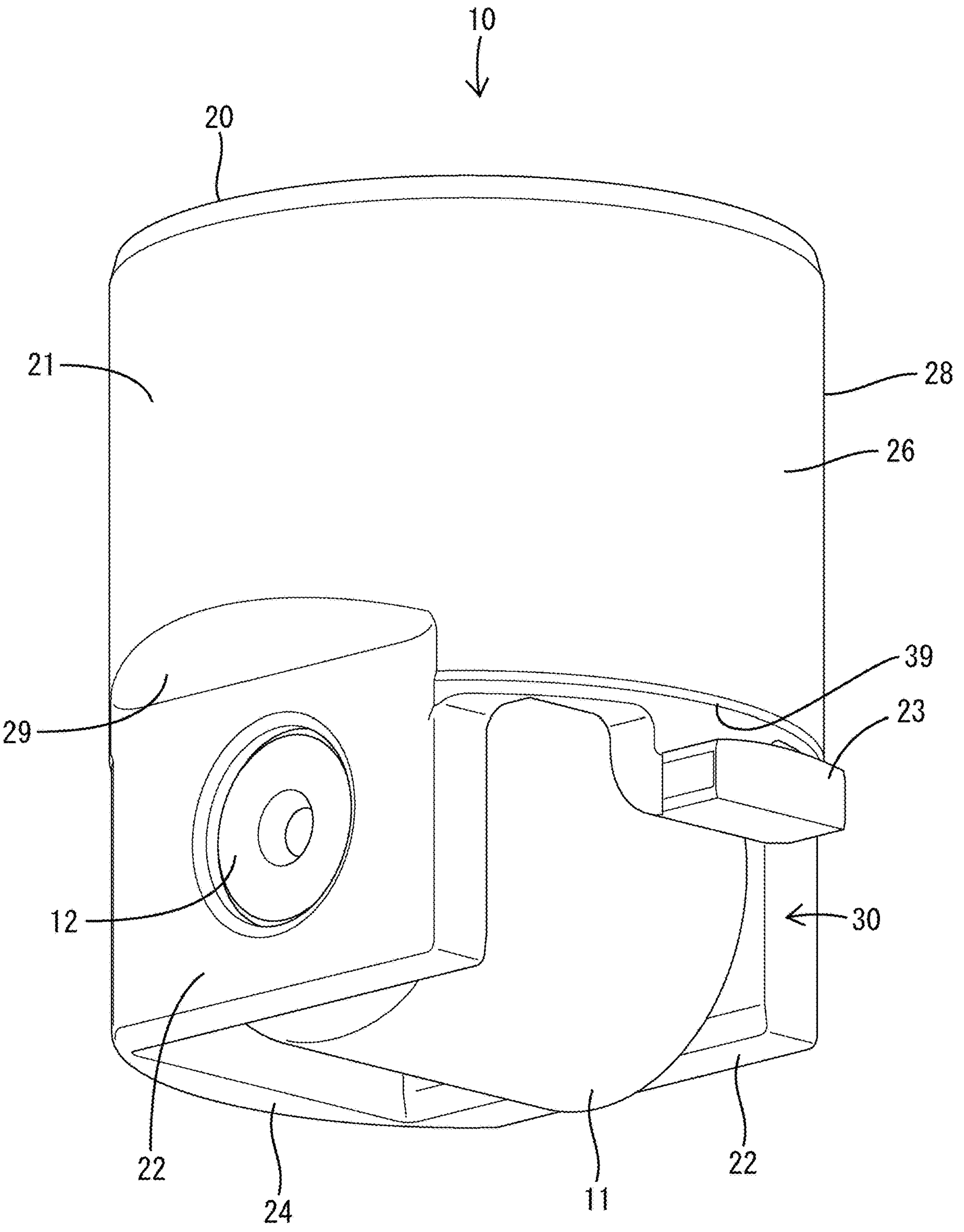
FIG. 2 is a perspective view of the roller lifter according to the first embodiment, as viewed from a diagonally lower front side.
Figure 3:
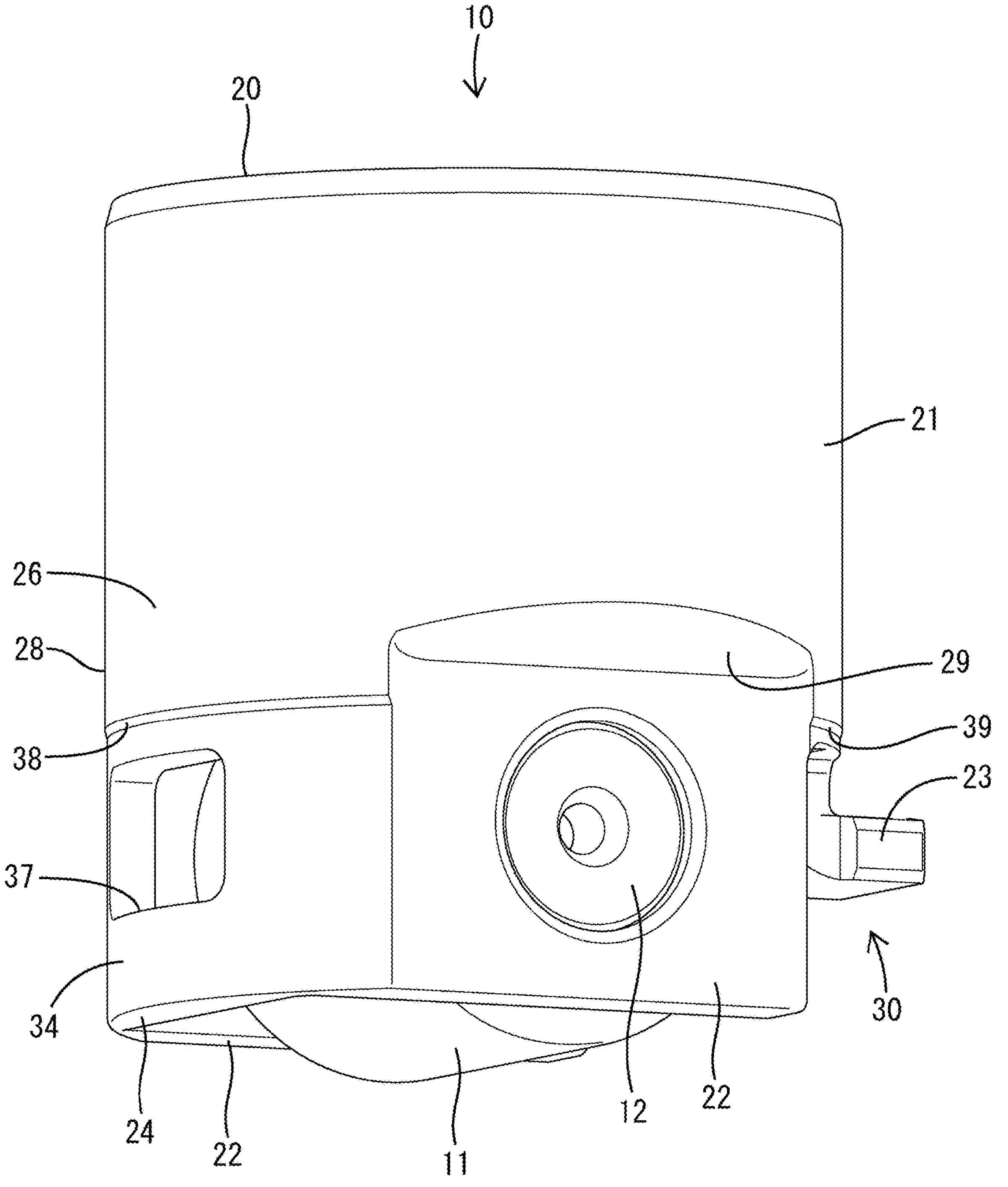
FIG. 3 is a perspective view of the roller lifter according to the first embodiment, as viewed from a diagonally lower rear side.
Figure 5:
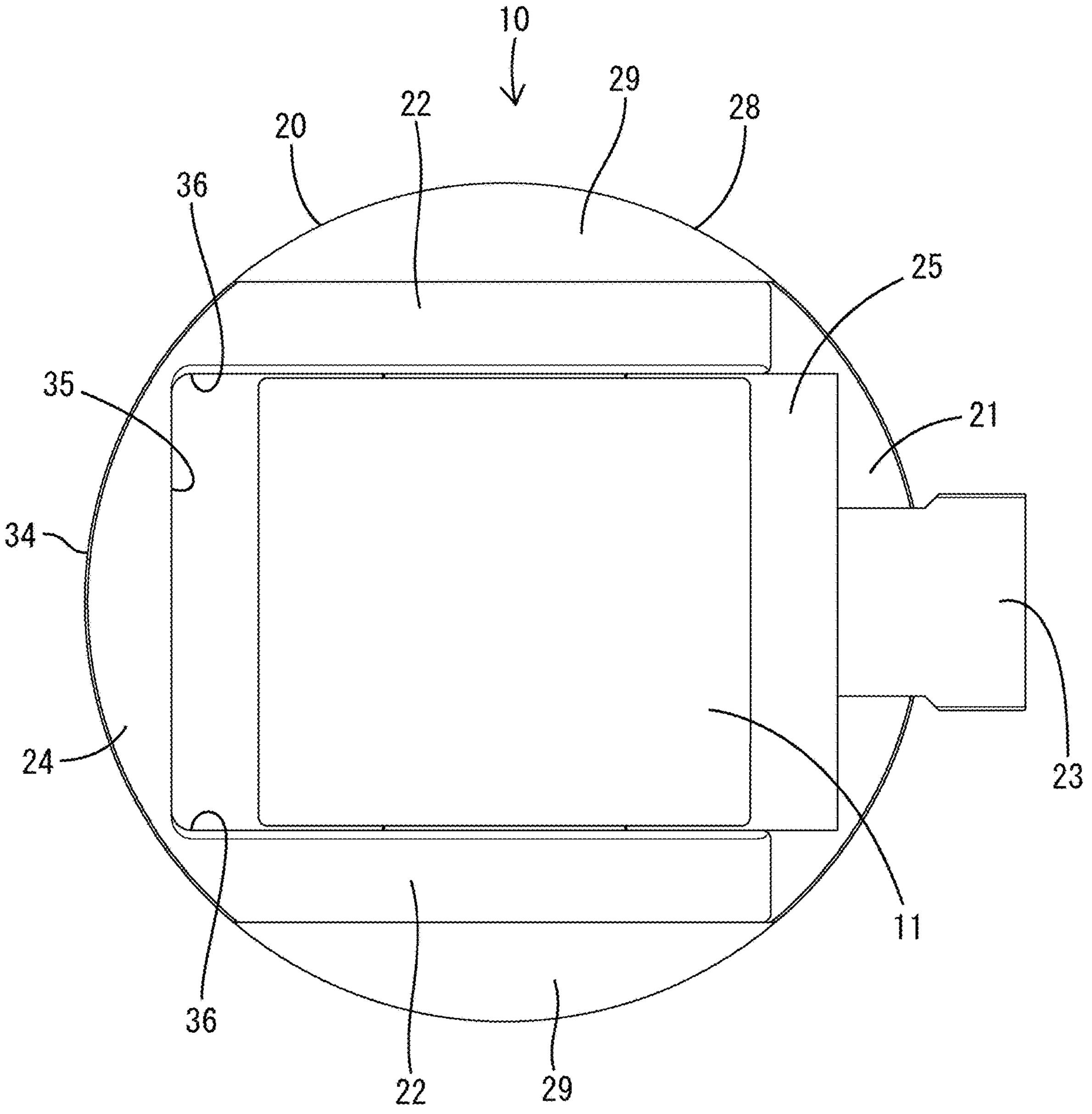
FIG. 5 is a bottom view of the roller lifter according to the first embodiment.

Each of the facing portions 22 has a vertical plate-like shape with a rectangular outer edge, and protrudes downward from corresponding one of left and right parts of the outer periphery of the base wall 25. As illustrated in FIG. 5, the facing portions 22 are disposed facing each other and in parallel with each other in the left-right direction. As illustrated in FIGS. 1 to 3, a shaft member 12 is provided in a manner bridging the facing portions 22. The shaft member 12 has a pin-like shape, and extends in parallel with the axial center of a cam shaft 91 on which the cam 90 is provided. Left and right ends of the shaft member 12 are respectively attached to the facing portions 22, rotatably or non-rotatably.

As illustrated in FIG. 1, the roller 11 is supported on the shaft member 12 rotatably about the axis thereof, with a plurality of rolling elements 13, such as needle roller bearings, disposed therebetween. The roller 11 is positioned below the base wall 25. The lower end of the roller 11 is in contact with the outer peripheral surface of the cam 90.

A lower end portion of the plunger 80, a retainer 81, and a coil spring 82 are housed in the space inside the peripheral wall 26 and above the base wall 25 of the lifter body 21. The retainer 81 is supported on the upper surface of the base wall 25, and is integrally attached to the lower end portion of the plunger 80. The coil spring 82 is held between an outer peripheral part of the retainer 81 and a spring seat surface 71 positioned thereabove.

The plunger 80 has a columnar shape extending in the up-down direction, and the part other than the lower end portion of the plunger 80 is inserted in an insertion hole 72 formed in the upper part of the lifter guide 70, in a manner movable in the up-down direction. The plunger 80 is configured to increase the volume of a pressure chamber, not illustrated, by being caused to move downward by the biasing force of the coil spring 82, and to reduce the volume of the pressure chamber by being caused to move upward against the biasing force of the coil spring 82, by being pressed by the cam 90.

Figure 6:
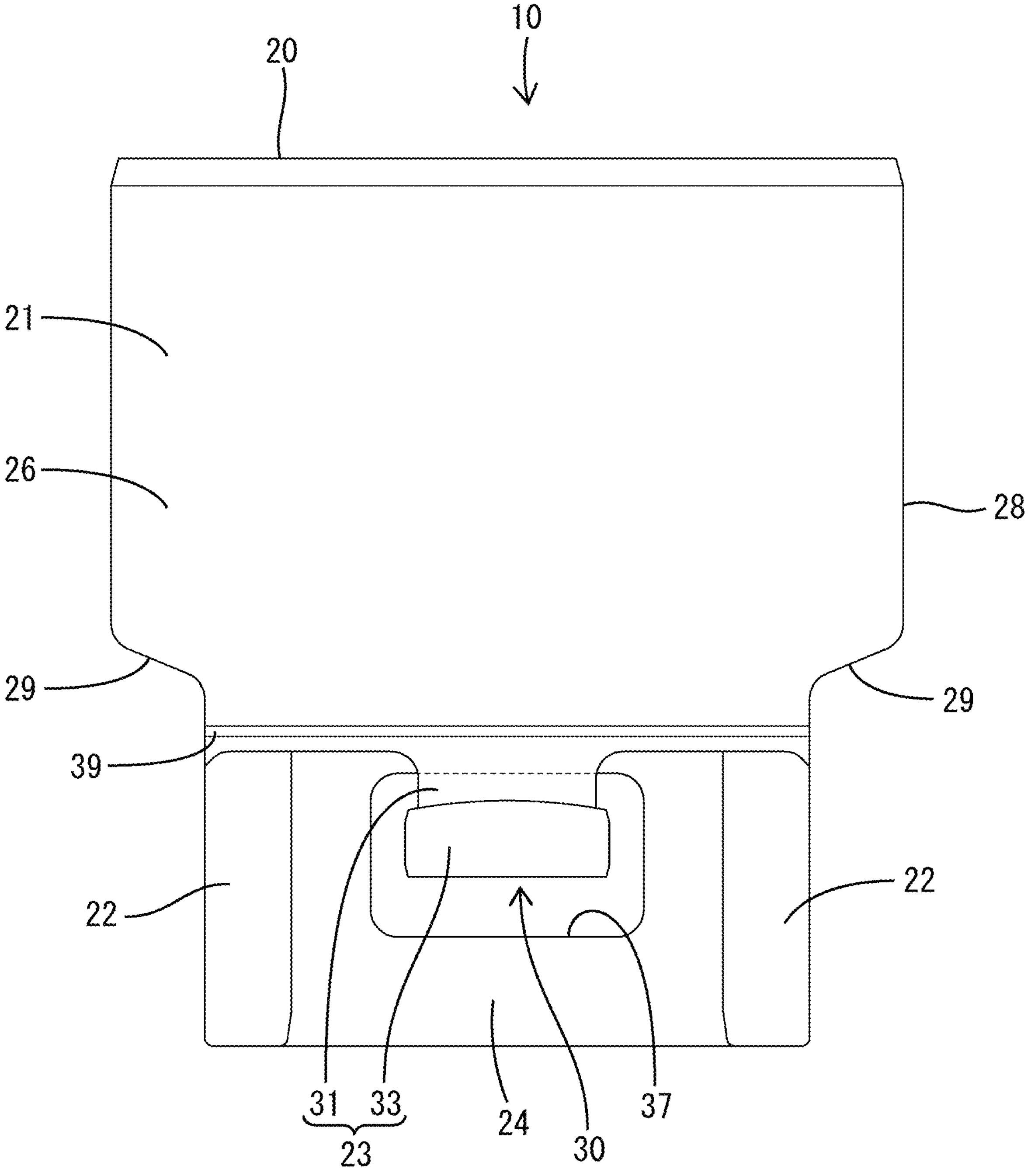
FIG. 6 is a front view of a lifter in the roller lifter according to the first embodiment.

The peripheral wall 26 of the lifter body 21 is inserted into the guide hole 73 of the lifter guide 70 in a manner movable in the up-down direction. A shallow recess 27 is provided over the entire inner circumferential surface of the peripheral wall 26. The recess 27 serves to reduce the weight of the lifter 20, and to lower the center of gravity of the lifter 20. The outer peripheral surface of the peripheral wall 26 serves as a sliding surface 28 which is slidable along the inner circumferential surface of the guide hole 73 and has a circular cross section. Left and right portions of the sliding surface 28 of the peripheral wall 26 are positioned outward in the left-right direction relative to the outer surfaces of the facing portions 22. As illustrated in FIGS. 5 and 6, the lifter 20 has a pair of inclined surfaces 29 each inclined inward in the radial direction, from corresponding one of the left and light portions of the sliding surface 28 to the outer surface of the corresponding one of the facing portions 22.

Figure 4:
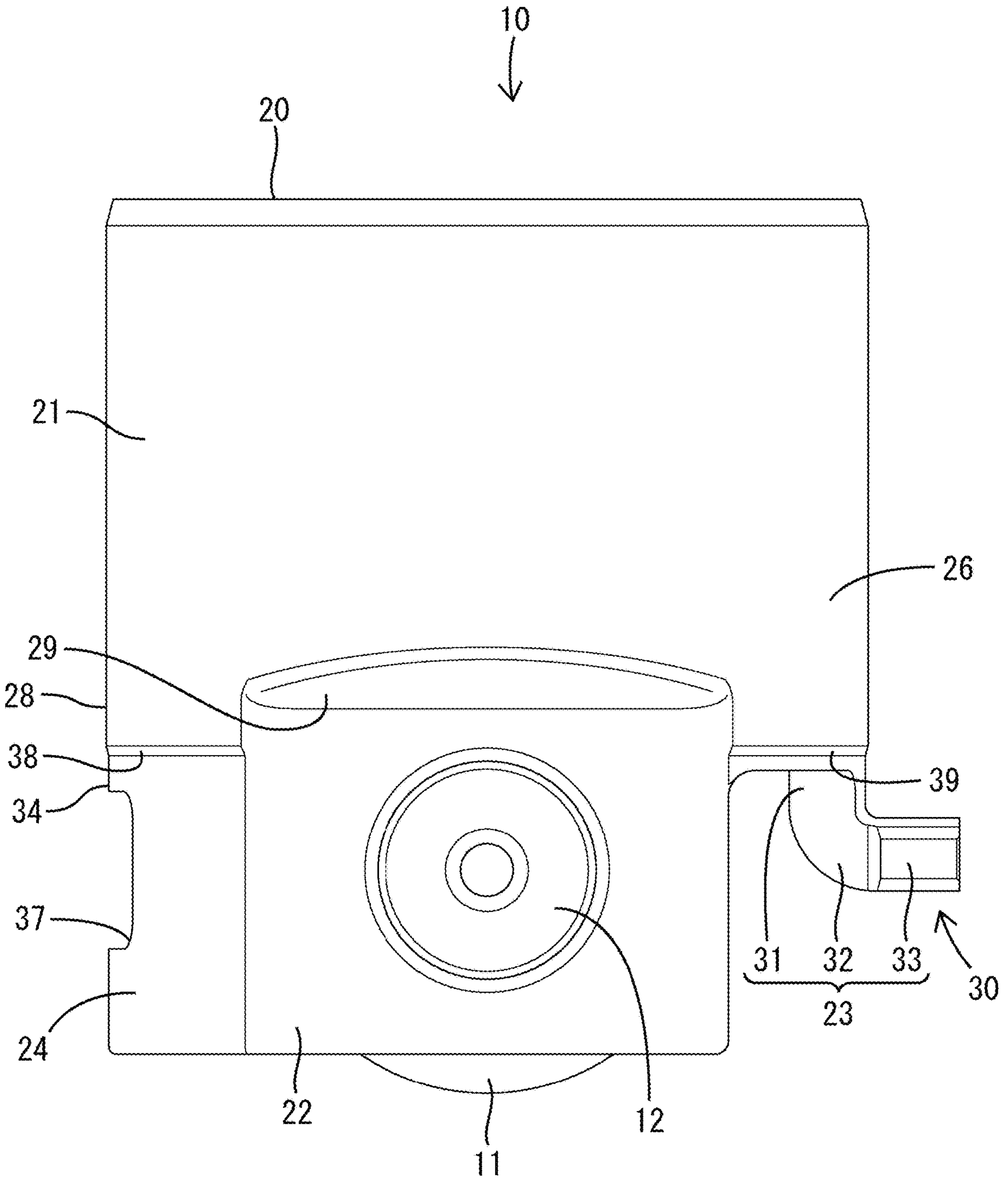
FIG. 4 is a side view of the roller lifter according to the first embodiment.

The rotation stopper 23 is formed by bending a part protruding downward from the lifter body 21, toward the front. As illustrated in FIG. 4, the rotation stopper 23 includes a proximal end portion 31 protruding downward from the front lower end of the lifter body 21, a bent portion 32 extending from the lower edge of the proximal end portion 31 and bent frontward in a curved shape, and a distal end portion 33 protruding frontward from the bent portion 32 by a distance longer than the proximal end portion 31. The proximal end portion 31 and the bent portion 32 extend in the up-down direction at a constant width in the left-right direction. As illustrated in FIG. 6, the distal end portion 33 has a greater width in the left-right direction, than the proximal end portion 31 (bent portion 32).

As illustrated in FIG. 1, the distal end portion 33 of the rotation stopper 23 is inserted into a rotation stopper groove 74 provided in the lifter guide 70, in a manner movable in the up-down direction. The rotation stopper groove 74 has a shape communicating with the guide hole 73 and extending in the up-down direction. The distal end portion 33 of the rotation stopper 23 is inserted into the rotation stopper groove 74 with positional displacements in the left-right direction restricted, whereby the roller lifter 10 is prevented from rotating about the axis inside the guide hole 73.

As illustrated in FIG. 2, the rotation stopper 23 is disposed apart in the circumferential direction of the lifter body 21 from the facing portions 22 which are positioned on the left and right sides of the rotation stopper 23. Below the rotation stopper 23, there is no element constituting the roller lifter 10, including the inertial mass 24, and an open space 30 which is open downward is provided.

The inertial mass 24 is configured as a weight that lowers the center of the gravity of the roller lifter 10 to a position lower than the center of the gravity of a conventional roller lifter not having the inertial mass 24. The inertial mass 24 is provided below the lifter body 21 (peripheral wall 26). In the case of the first embodiment, the position of the center of gravity of the roller lifter 10 is set below the lifter body 21, and is set, for example, within the area of the circular cross section of the roller 11 including the shaft member 12 and the rolling elements 13.

As illustrated in FIGS. 2 and 3, the inertial mass 24 is a wall-like portion extending downward from the rear lower end of the lifter body 21. Circumferential edges (front edges) of the inertial mass 24 are integrally connected to the rear end edges of the facing portions 22. The lower end edge of the inertial mass 24 is continuous with the lower end edges of the facing portions 22 at the same height (horizontal position) without any step.

The outer surface of the inertial mass 24 serves as a non-sliding surface 34 having an arc-like cross section that is concentric with the outer peripheral surface of the lifter body 21. The non-sliding surface 34 of the inertial mass 24 is positioned radially inward relative to the rear part of the sliding surface 28 of the peripheral wall 26 (see FIG. 3), and is disposed non-slidingly with respect to the inner peripheral surface of the guide hole 73 of the lifter guide 70. As illustrated in FIG. 5, the inner surface of the inertial mass 24 includes a rear inner surface 35 extending in the left-right direction and positioned spaced apart rearward from the outer peripheral surface of the roller 11 by a certain distance, and a pair of side inner surfaces 36 extending along the front-back direction to be continuous to the inner surfaces of the facing portions 22. The thickness of the inertial mass 24 at the portions corresponding to intersections between the side inner surfaces 36 and the rear inner surface 35 (inner corners) is smaller than the thickness of the other portions of the inertial mass 24.

As illustrated in FIGS. 3 and 6, the inertial mass 24 has an opening 37 which opens in a rectangular shape in a rear view, at a position opposite to the rotation stopper 23 in the radial direction, with the roller 11 interposed therebetween. When the lifter 20 is viewed from the rear side, the bent portion 32 of the rotation stopper 23 is visible through the opening 37. A punch (pressing die), not illustrated, is inserted into the space between the facing portions 22, from the rear side of the lifter 20 through the opening 37, and the bent portion 32 of the rotation stopper 23 is formed together with the distal end portion 33 by being pressed by the inserted punch. In this way, the opening 37 serves as an insertion hole (access hole) through which a punch is inserted when bending the rotation stopper 23.

As illustrated in FIGS. 3 and 4, the lifter 20 has a rear offset surface 38 inclined radially inward by a short distance, from the sliding surface 28 of the rear part of the peripheral wall 26 toward the non-sliding surface 34 of the inertial mass 24. The rear offset surface 38 is formed continuously in the circumferential direction, between the peripheral wall 26 forming the rear part of the outer peripheral surface of the lifter 20 and the inertial mass 24. The lifter 20 also has a front offset surface 39 which is provided continuously in the circumferential direction on the front part of the outer peripheral surface of the lifter 20, at the same height position as the rear offset surface 38 (see FIGS. 2 and 6). The front offset surface 39 is inclined radially inward from the front part of the sliding surface 28 of the peripheral wall 26 to the front surface of the proximal end portion 31 of the rotation stopper 23.

Operation of Roller Lifter 10

When manufacturing the lifter 20, the lifter 20 is subjected to polishing process, such as centerless grinding, so that the sliding surface 28 of the lifter body 21 has a perfectly circular cross section, whereby the sliding surface 28 is formed. After the polishing process, the roller 11 and the shaft member 12 are assembled to the lifter 20.

When assembling the fuel feeding apparatus, the lifter 20 is inserted into the guide hole 73 of the lifter guide 70, and the roller 11 is brought into contact with the cam 90 to be supported thereon (see FIG. 1). When the plunger 80 is lowered by the biasing force of the coil spring 82 and the volume inside the pressure chamber, not illustrated, increases, the fuel fed from a pump of a fuel tank, not illustrated, is suctioned into the pressure chamber. When the cam 90 rotates together with the cam shaft 91 to raise the plunger 80, and the volume inside the pressure chamber decreases, the fuel inside the pressure chamber is pressurized and pressure-fed (discharged) to a fuel feeder pipe, not illustrated.

When the lifter 20 reciprocates in the lifter guide 70, the lifter 20 receives a component force (load) acting in a direction intersecting with the up-down direction that is the direction in which the lifter 20 moves. In the case of the first embodiment, since the position of the center of gravity of the lifter 20 has been lowered by the presence of the inertial mass 24, the moment of inertia can be increased while the lifter 20 reciprocates, so that the orientation of the moving lifter 20 can be maintained stably. Therefore, it is possible to prevent the lifter 20 from tilting within the gap between the inner peripheral surface of the guide hole 73 and the sliding surface 28 of the lifter body 21. As a result, according to the first embodiment, it is possible to prevent defects such as generation of lifter hitting noise caused by the tilt of the lifter 20.

In addition, even though the inertial mass 24 enters the inside of the guide hole 73 while the lifter 20 reciprocates in the lifter guide 70, since the non-sliding surface 34 of the inertial mass 24 is recessed radially inward relative to the sliding surface 28, it is possible to prevent the inertial mass 24 from coming into contact with the inner peripheral surface of the guide hole 73, so that generation of lifter hitting noise can be prevented more reliably.

There is an issue that it is difficult to perform polishing, such as centerless grinding, on a part below the rotation stopper 23 due to the protruding shape of the rotation stopper 23. In this regard, in the case of the first embodiment, the part below the rotation stopper 23 is open as the open space 30. Therefore, in the first place, there is no need to perform polishing on the part below the rotation stopper 23, and even though the lifter 20 includes the inertial mass 24, it is possible to prevent unnecessary increase in size and complexity.

Furthermore, since the inertial mass 24 protrudes downward from the outer peripheral part of the lifter body 21 and is connected to the pair of facing portions 22, the structure of the lifter 20 can be further simplified, and the mechanical strength of the lifter 20 can be improved. In addition, since each of the pair of facing portions 22 and the rotation stopper 23 are spaced apart from each other, it is possible to prevent the pair of facing portions 22 from becoming an obstacle in the process of bending the rotation stopper 23.

Furthermore, in the case of the first embodiment, since the inertial mass 24 has the opening 37 at a position opposite to the rotation stopper 23, with the roller 11 interposed therebetween, it is possible to form the rotation stopper 23 by inserting a punch (press die) through the opening 37, and bending of the rotation stopper 23 can be performed more easily.

Second Embodiment

As illustrated in FIGS. 7 to 11, a roller lifter 10A according to a second embodiment of the present disclosure is different from the roller lifter 10 according to first embodiment in that an inertial mass 24A is provided in a rotation stopper 23A. The parts other than the inertial mass 24A are substantially the same as those in the first embodiment, and the parts in the second embodiment that are the same as or corresponding to those in the first embodiment are denoted by the same reference numerals, and redundant description will be omitted.

Figure 8:
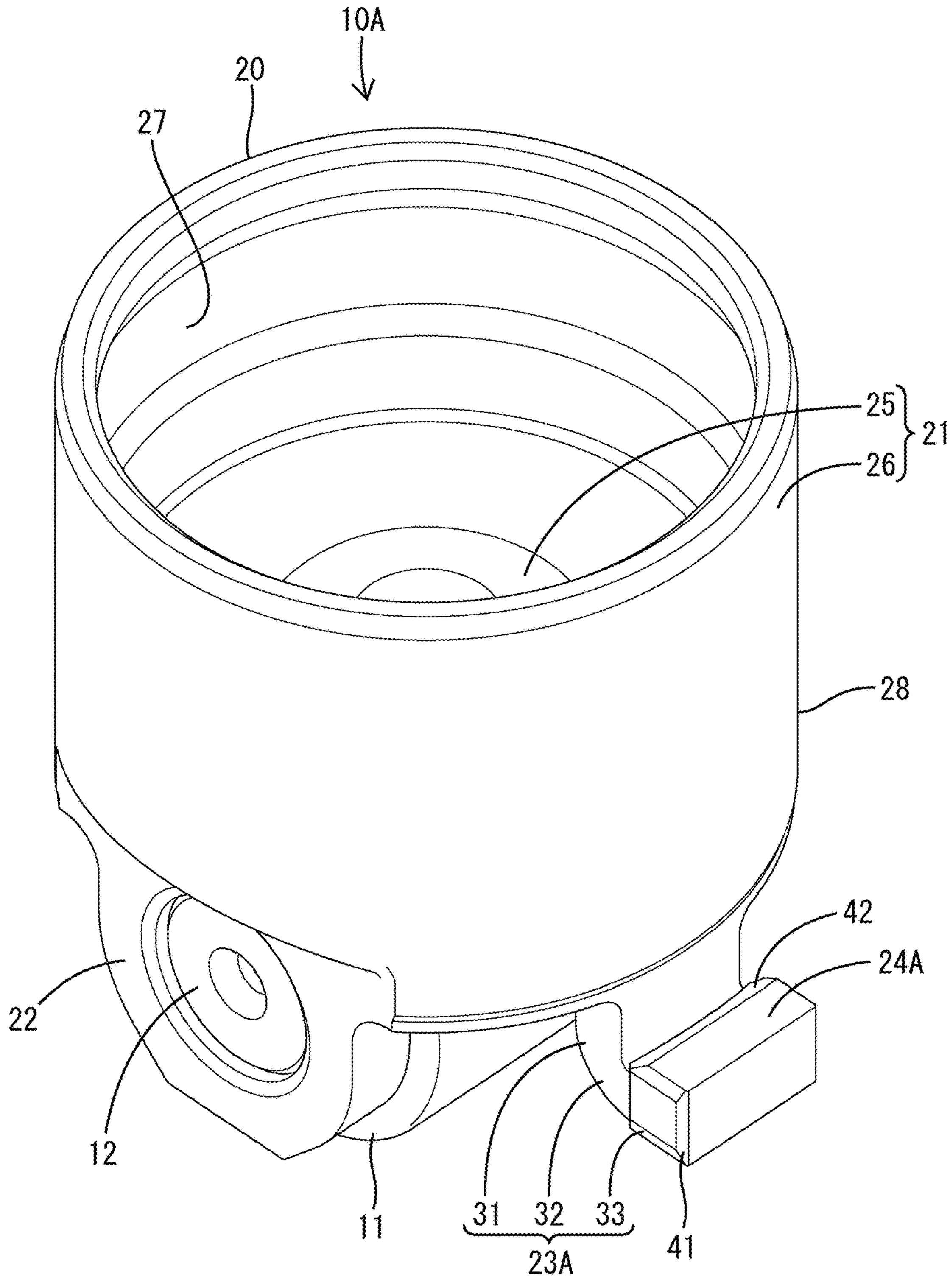
FIG. 8 is a perspective view of the roller lifter according to the second embodiment, as viewed from a diagonally upper front side.
Figure 9:
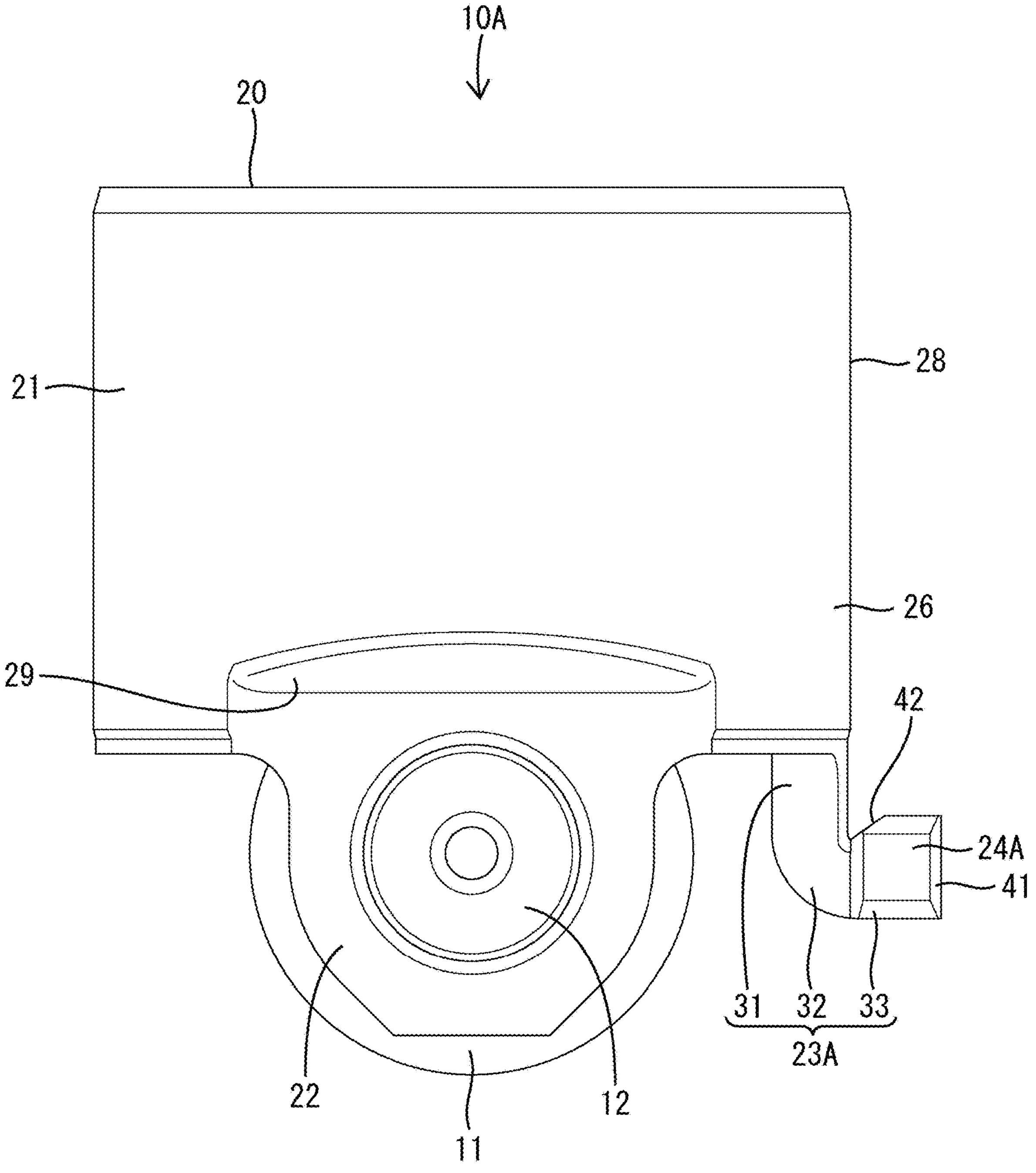
FIG. 9 is a side view of the roller lifter according to the second embodiment.
Figure 10:
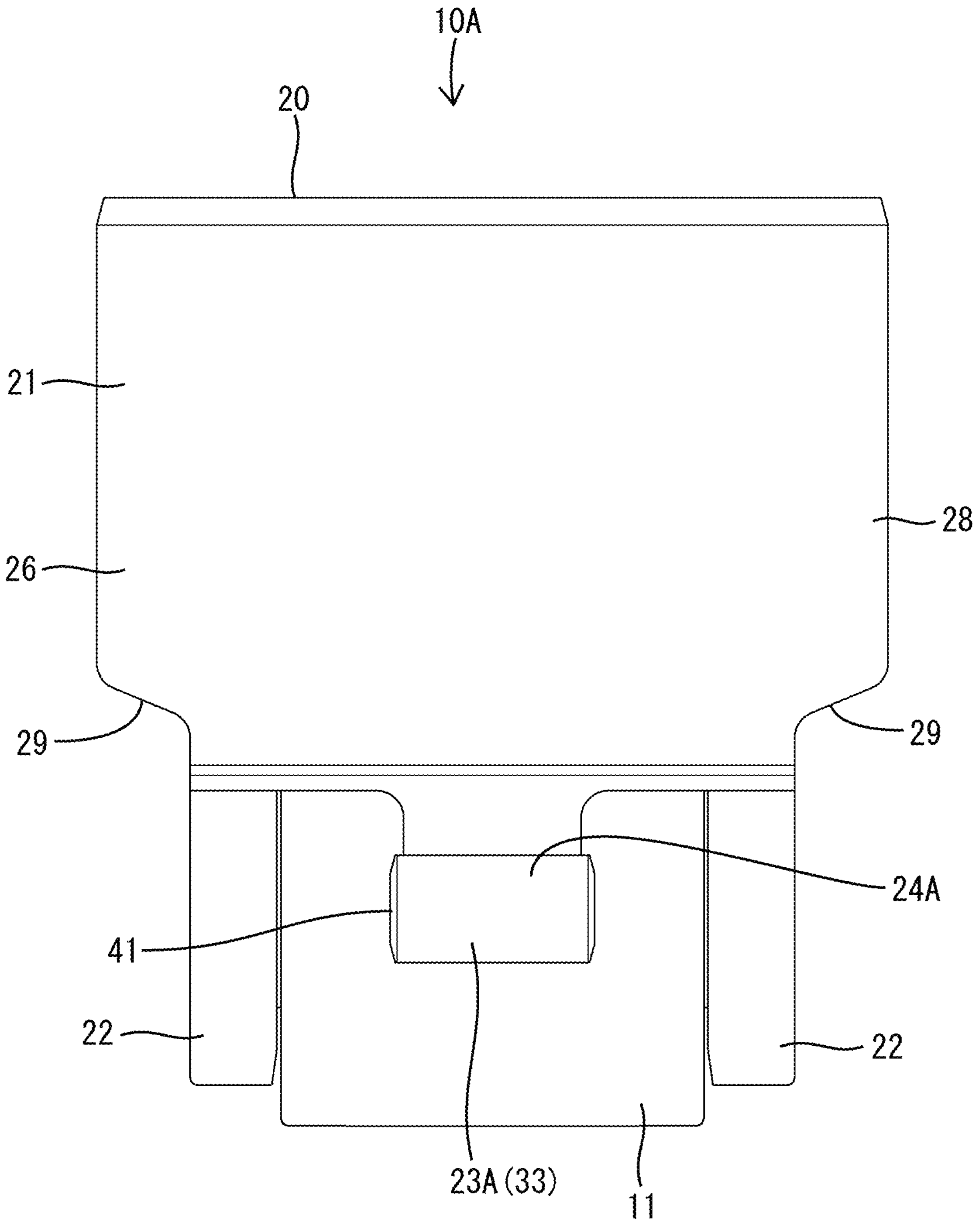
FIG. 10 is a front view of the roller lifter according to the second embodiment.

As illustrated in FIGS. 8 and 9, the inertial mass 24A is provided integrally with the distal end portion 33 of a rotation stopper 23A which is constituted of the proximal end portion 31, the bent portion 32, and the distal end portion 33. In the lifter 20, behind the rotation stopper 23A, there is no inertial mass, and the part is open. As in the first embodiment, the part below the inertial mass 24A is open as the open space 30.

The inertial mass 24A is provided in a rectangular parallelepiped shape at the upper end portion of the distal end portion 33, and is provided in a manner protruding upward so as to increase the thickness in the up-down direction with respect to the portion excluding the upper end portion. The maximum thickness of the distal end portion 33 in the up-down direction (the dimension between the upper and lower surfaces of the distal end portion 33 excluding inclined edges 41 and a chamfered part 42 to be described later) is larger than the maximum thickness of the proximal end portion 31 in the front-back direction (dimension between the front and rear surfaces of the proximal end portion 31).

The upper surface of the inertial mass 24A is disposed horizontally in the left-right direction as well as in the front-back direction. As illustrated in FIG. 9, each end surface of the distal end portion 33 in the left-right direction including the inertial mass 24A has a quadrangular outer shape in a side view, and each of the four sides are formed with an inclined edge 41 in a chamfered shape.

Figure 7:
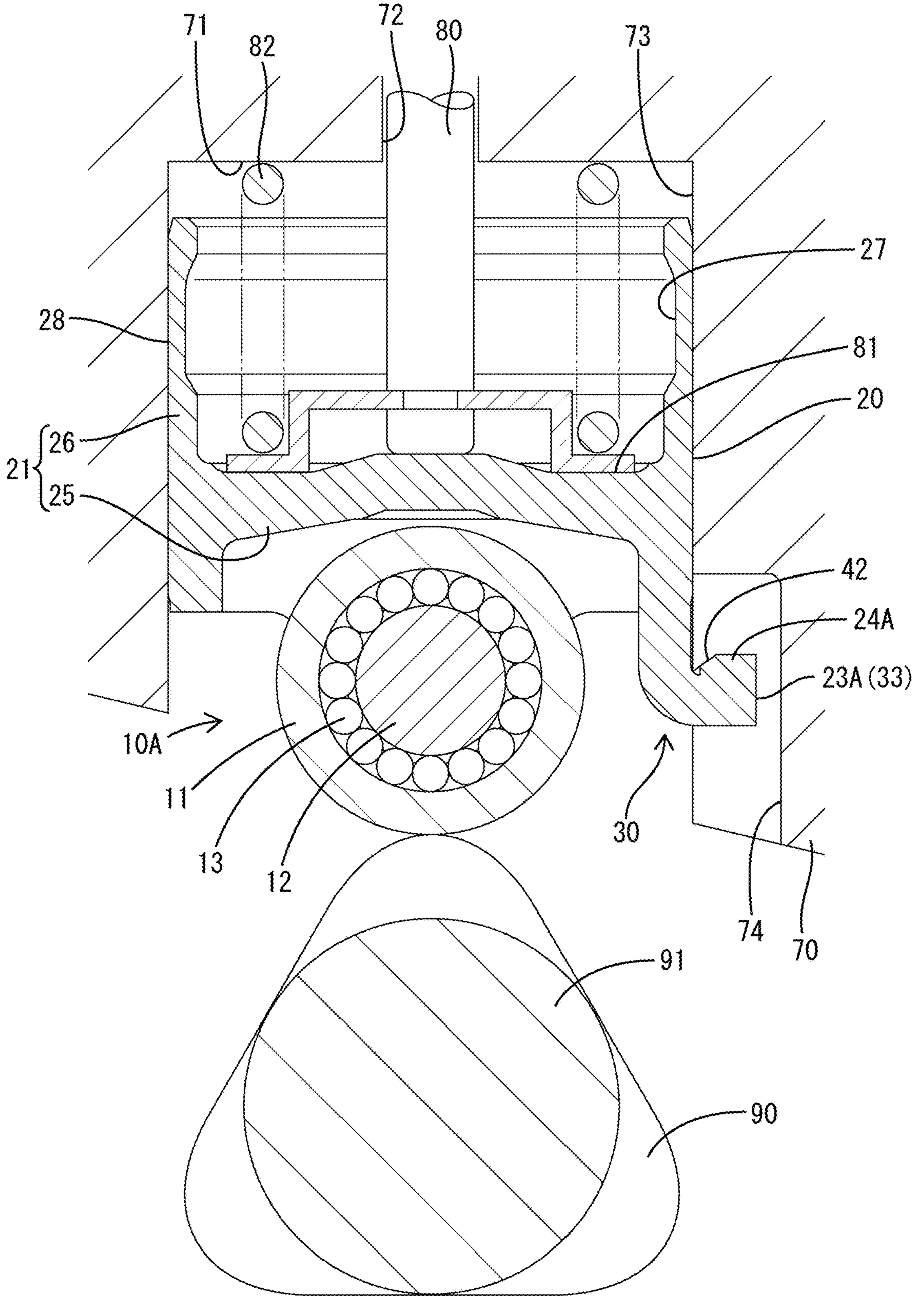
FIG. 7 is a cross-sectional view of a fuel feeding apparatus including a roller lifter according to a second embodiment.

As illustrated in FIGS. 7 to 9, the rear surface of the inertial mass 24A is disposed in a manner facing the proximal end portion 31, and the chamfered part 42 in a chamfered shape is formed at the upper end corner of the rear surface over the entire width in the left-right direction. The length of the chamfered part 42 in the direction of the inclination of the chamfered part 42 is larger than the length of the inclined edge 41 in the direction of the inclination of the inclined edge 41. The acute angle by which the chamfered part 42 is inclined with respect to the up-down direction is greater than the acute angle by which the inclined edge 41 is inclined with respect to the up-down direction, and is set to 30 degrees to 60 degrees, more preferably 35 degrees to 55 degrees, and still more preferably about 45 degrees.

Figure 11B:
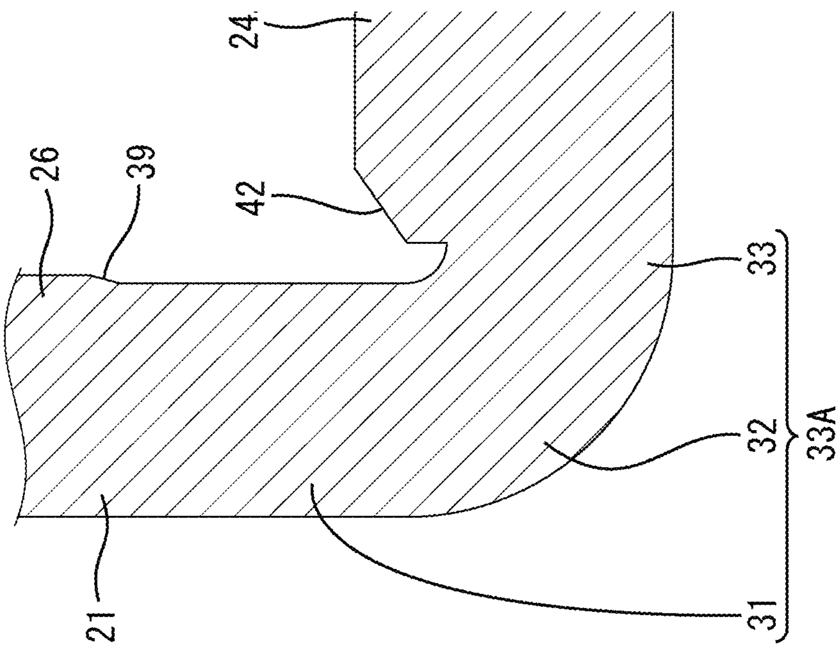
FIGS. 11A and 11B are partially enlarged cross-sectional views illustrating a step of bending a rotation stopper of the roller lifter according to the second embodiment.
Figure 11A:
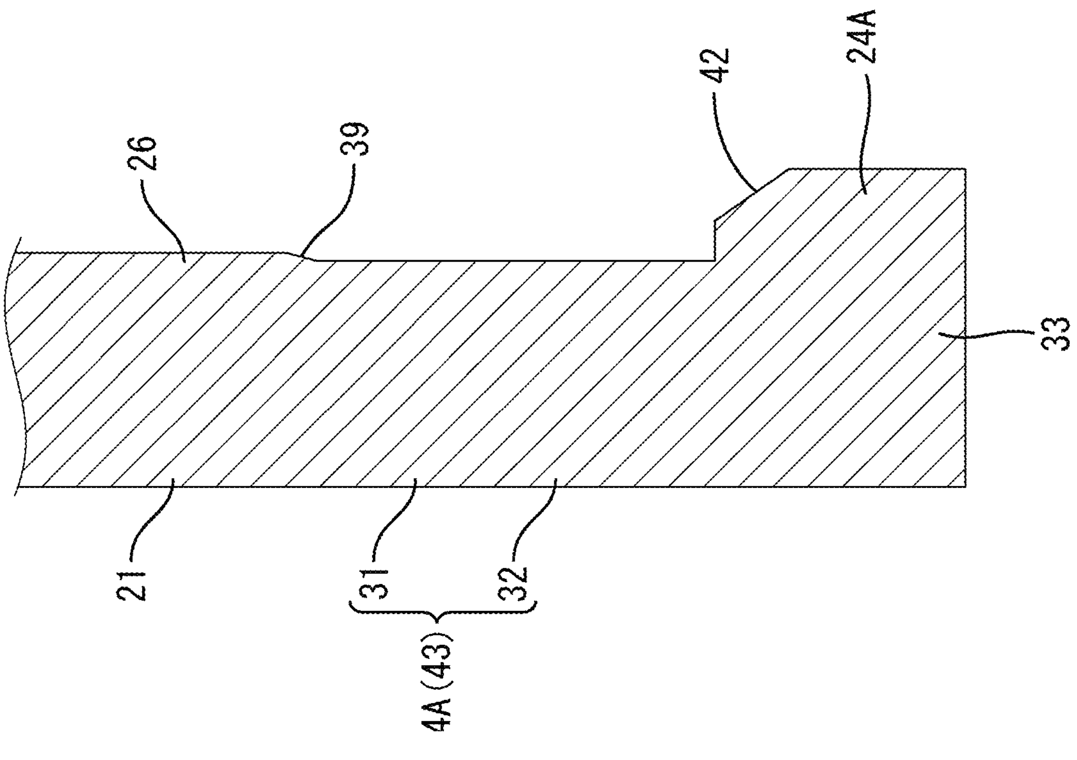

As illustrated in FIG. 11A, before the rotation stopper 23A is bent, the rotation stopper 23A is configured as a straight portion 43 extending straight downward from the lifter body 21, as a whole. The inertial mass 24A has a shape protruding forward at the lower end portion of the straight portion 43. The proximal end portion 31 and the bent portion 32 extend in the up-down direction and have a constant thickness in the radial direction. When a punch, not illustrated, is exerted against the straight portion 43 from the rear side, the bent portion 32 is bent, and the distal end portion 33 is caused to protrude frontward.

As illustrated in FIG. 11B, the bent portion 32 is bent at an angle of about 90 degrees with respect to the proximal end portion 31, and the distal end portion 33 is disposed substantially horizontally. Since the bent portion 32 is formed thinner than the peripheral wall 26, via the front offset surface 39, the bending can be performed easily.

In the process of bending the rotation stopper 23A, the bent portion 32 may be temporarily bent at an angle greater than 90 degrees with respect to the proximal end portion 31 toward the side closer to the proximal end portion 31, considering the spring-back of the bent portion 32. In the case of the second embodiment, even if the bent portion 32 is bent at an angle greater than 90 degrees in consideration of the spring-back, it is possible to prevent the inertial mass 24A from interfering with the proximal end portion 31 because the chamfered part 42 has a shape retracted from the proximal end portion 31. Therefore, it is possible to more reliably prevent the inertial mass 24A from becoming an obstacle in the process of bending the rotation stopper 23A.

As described above, according to the second embodiment, since the inertial mass 24A is included in the rotation stopper 23A, the structure of the lifter 20 can be further simplified, and the mechanical strength of the rotation stopper 23A can be improved. In addition, since the inertial mass 24A is provided in the distal end portion 33 of the rotation stopper 23A in the shape increasing the thickness of the distal end portion 33 in the up-down direction, it is possible to use the existing lifter guide 70 as it is, without the need for changing the groove width or the like of the rotation stopper groove 74 of the lifter guide 70.

Furthermore, since the inertial mass 24A is formed by thickening the upper end portion of the distal end portion 33, which does not lead to an increase in size of the viatical dimension of the rotation stopper 23A, and consequently the lifter 20 as well, it is easy to set such that the rotation stopper 23A and the cam 90 are prevented from interfering with each other.

Another Embodiment

Figure 12:
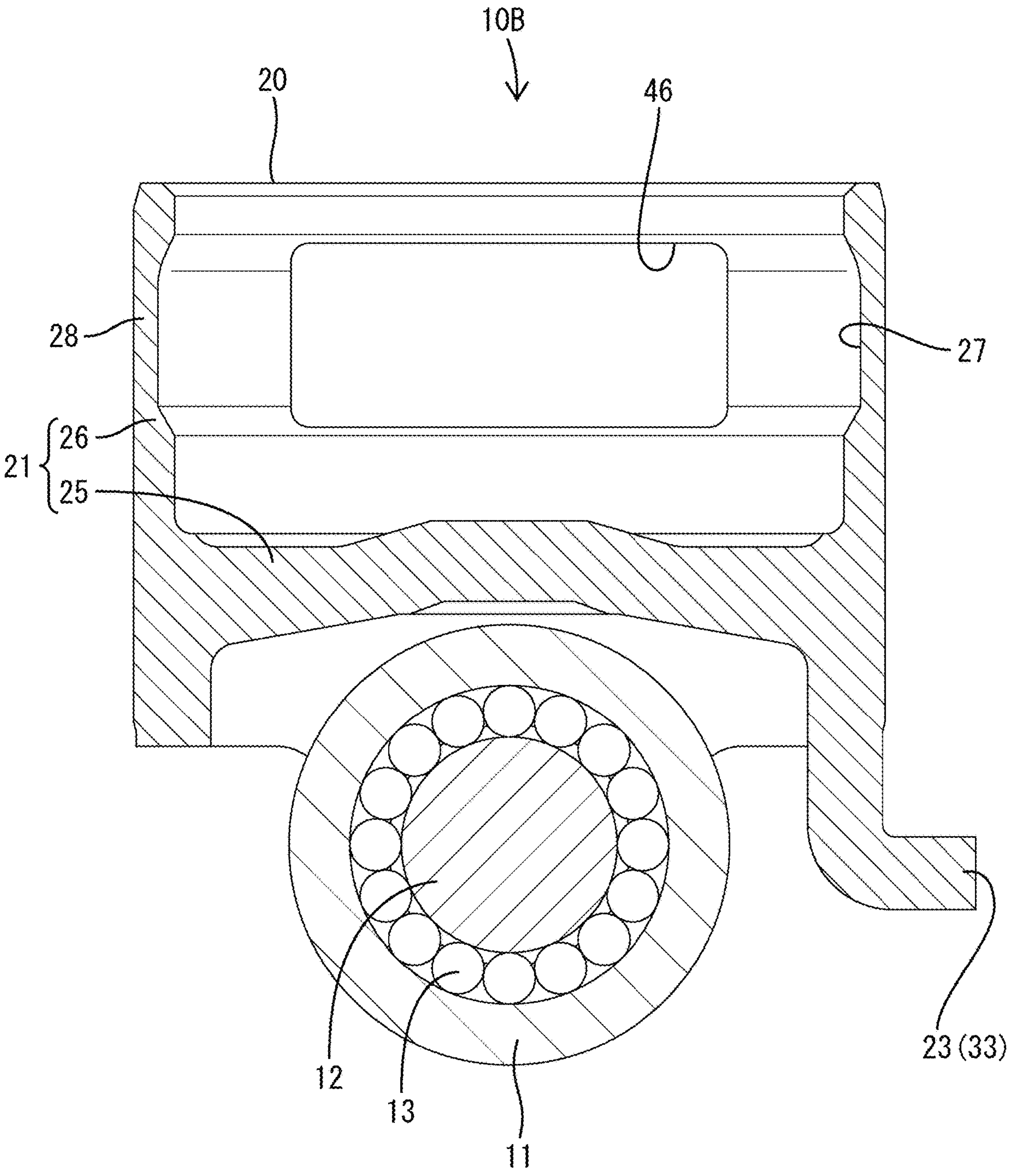
FIG. 12 is a cross-sectional view of a roller lifter according to another embodiment.

A roller lifter 10B according to another embodiment is illustrated in FIG. 12. The roller lifter 10B is different from the roller lifters according to the first and second embodiments in that the peripheral wall 26 has a through hole 46. In this other embodiment also, the parts that are the same as or corresponding to those in the first embodiment are denoted by the same reference numerals, and redundant description thereof will be omitted.

The through hole 46 is a hole penetrating the peripheral wall 26 of the lifter body 21 in the thickness direction. The through hole 46 is, for example, a substantially quadrangular opening that is elongated in the front-back direction, and the through holes 46 are provided in pairs at height positions corresponding to the recesses 27 in the left and right portions of the peripheral wall 26. The through holes 46 are provided in the peripheral wall 26 in a manner facing each other in the left-right direction which is orthogonal to the rotation direction of the roller 11, and are positioned out of the region that strongly comes into contact with (slides along) the inner peripheral surface of the guide hole 73. Therefore, the sliding surface 28 of the lifter 20 can slide along the lifter guide 70 stably.

In the case of the other embodiment, since the peripheral wall 26 has the through holes 46, the weight of an upper part of the lifter 20 can be reduced as compared with a lifter without the through hole 46. As a result, the position of the center of gravity of the lifter 20 can be lowered, and it is possible to make the lifter 20 less likely to tilt inside the guide hole 73 when the roller lifter 10B reciprocates in the lifter guide 70.

The roller lifter according to the present disclosure is not limited to the description above, and may also be a roller lifter including at least two of: the inertial mass according to the first embodiment, which hangs down in the rear part of the lifter; the inertial mass according to the second embodiment, which is provided in the rotation stopper; and the through holes according to the other embodiment, which penetrates the peripheral wall. Further, the roller lifter may include an inertial mass according to the first embodiment that has a shape in which the opening is not formed and the entire wall is closed. The present invention is applicable not only to the fuel feeding apparatus but also to, for example, a valve train system of an internal combustion engine, such as a valve lifter.

The invention claimed is:

1. A roller lifter comprising:

a lifter body that is cylindrical and that reciprocates in a lifter guide in an up-down direction;

a pair of facing portions that protrude downward from the lifter body and face each other in a manner spaced apart from each other in a radial direction of the lifter body;

a rotation stopper that is positioned between the pair of facing portions, and that has a shape protruding downward from the lifter body and bent outward in the radial direction;

a shaft member that extends in the radial direction and has both ends in the radial direction respectively supported on the pair of facing portions;

a roller that is rotatably provided on the shaft member and is in contact with a cam; and an inertial mass that is provided below the lifter body, wherein a part below the rotation stopper does not have the inertial mass and is open, the inertial mass protrudes downward from an outer peripheral part of the lifter body, and is connected to the pair of facing portions, and the pair of facing portions are spaced apart from the rotation stopper.

2. The roller lifter according to claim 1, wherein an outer peripheral surface of the inertial mass is positioned inward in the radial direction relative to an outer peripheral surface of the lifter body.

3. The roller lifter according to claim 1, wherein the inertial mass has an opening at a position opposite to the rotation stopper, with the roller interposed between the inertial mass and the rotation stopper.

4. A roller lifter comprising:

a lifter body that is cylindrical and that reciprocates in a lifter guide in an up-down direction;

a pair of facing portions that protrude downward from the lifter body and face each other in a manner spaced apart from each other in a radial direction of the lifter body;

a rotation stopper that is positioned between the pair of facing portions, and that has a shape protruding downward from the lifter body and bent outward in the radial direction;

a shaft member that extends in the radial direction and has both ends in the radial direction respectively supported on the pair of facing portions;

a roller that is rotatably provided on the shaft member and is in contact with a cam; and an inertial mass that is provided below the lifter body, wherein a part below the rotation stopper does not have the inertial mass and is open, the rotation stopper includes a proximal end portion connected to an outer peripheral part of the lifter body and extending in the up-down direction, a distal end portion extending in the radial direction, and a bent portion positioned between the proximal end portion and the distal end portion, the inertial mass is provided in the distal end portion, and a maximum thickness of the distal end portion in the up-down direction is larger than a maximum thickness of the proximal end portion in the radial direction, by a thickness of the inertial mass in the up-down direction.

5. The roller lifter according to claim 4, wherein the inertial mass has a rectangular parallelepiped shape, and has a chamfered part on an inner corner facing the proximal end portion.

6. The roller lifter according to claim 2, wherein the inertial mass has an opening at a position opposite to the rotation stopper, with the roller interposed between the inertial mass and the rotation stopper.

* * * * *